United States Patent [19]

Ikegami et al.

[11] Patent Number: 5,055,145

[45] Date of Patent: Oct. 8, 1991

[54] PRODUCTION PROCESS OF FERRITE STAINLESS STEEL COVERED WITH OXIDE WHISKER

[75] Inventors: Yuji Ikegami; Shinichi Sasayama; Noboru Tachino; Takeshi Kamiya, all of Kawasaki, Japan

[73] Assignee: Nippon Yakin Kogyo Co., Ltd., Tokyo, Japan

[21] Appl. No.: 393,946

[22] Filed: Aug. 15, 1989

Related U.S. Application Data

[62] Division of Ser. No. 277,649, Nov. 29, 1988.

[30] Foreign Application Priority Data

Nov. 30, 1987 [JP] Japan .................................. 62-299711
Jul. 6, 1988 [JP] Japan .................................. 63-166958
Jul. 6, 1988 [JP] Japan .................................. 63-166959
Sep. 6, 1988 [JP] Japan .................................. 63-221279

[51] Int. Cl.$^5$ ............................................. F01N 3/10
[52] U.S. Cl. .................................... 148/285; 502/439

[58] Field of Search ......................... 502/439; 148/285

[56] References Cited

U.S. PATENT DOCUMENTS 4,331,631  5/1982  Chapman ............................. 502/439
4,729,912  5/1988  Kilbane ............................. 427/376.8
4,837,091  6/1989  Nickola ............................. 427/431
4,915,751  4/1990  Vaneman ............................. 148/280

Primary Examiner—Sam Silverberg
Attorney, Agent, or Firm—Sherman and Shalloway

[57] ABSTRACT

This invention concerns a production process of ferrite stainless steel covered with oxide whisker suitable for metal catalyst supports in automobile's exhaust gas converters, which comprises controlling the continued growth of alumina whiskers on ferrite stainless steel by heating ferrite stainless steel having alumina whiskers on the surface to 1000°–1200° C. for about 1 minute to 1 hour in a non-oxidizing atmosphere.

3 Claims, 5 Drawing Sheets

PRODUCTION PROCESS OF FERRITE STAINLESS STEEL COVERED WITH OXIDE WHISKER

This is a division of application Ser. No. 07/277,649, filed Nov. 29, 1988.

FIELD OF THE INVENTION

This invention relates to a production process of ferrite stainless steel covered with oxide whisker. In particular, it relates to a production process of ferrite stainless steel covered with oxide whisker suitable for catalyst supports in automobile's exhaust gas converters or for catalytic reactors used in industrial chemical plants.

DESCRIPTION OF THE PRIOR ART

So far there has been used codierite ($2MgO, 2Al_2O_3, 5SiO_2$) made honeycomb as catalyst supports for automobile's exhaust gas converters. However, when the honeycomb is made out of stainless steel instead of codierite, the washcoat containing precious metal catalyst readily flakes off therefrom by the rapid change in the temperature or the vibration of exhaust gas converters, which has thus made a problem.

For this, a honeycomb made of aluminium-containing stainless steel is heat-treated, on which alumina whisker is allowed to grow in order to improve the washcoat adhesion Like this, ferrite stainless steel covered with oxide whisker shows such good adhesion of the washcoat that it is indispensable for automobile's exhaust gas converters. In this respect, there have already been disclosed various proposals; for example, disclosed in Japanese patent application laid-open publication No. sho 56-96726 is a production process of ferrite stainless steel foil, which comprises: heating ferrite stainless steel foil, produced by the metal peeling off process, at a temperature between 870° and 970° C. in the air for oxidation, the ferrite stainless steel foil containing not less than 15 percent and not more than 25 percent of chromium, and not less than 3 percent and not more than 6 percent of aluminium. Also, disclosed in Japanese patent application laid-open publication No. sho 57-71898 is a process, comprising: heating stainless steel foil at 875°–925° C. in either carbon dioxide, nitrogen, hydrogen or rare gas atmosphere of the oxygen partial pressure 0.75 Torr and below for about one minute and then heating the ferrite stainless steel foil at 870°–930° C. for many hours, the ferrite stainless steel foil containing not less than 15 percent and not more than 25 percent of chromium and not less than 3 percent and not more than 6 percent of aluminium.

Nevertheless, the peeling-off process employed in 56-96726 is difficult to be adopted to the mass-production of ferrite stainless steel foil, and the process employed in 57-71898 is similarly unsuitable for the mass-production because there is used an Al-enriched (3–6%) stainless steel, of which the ductilty is very poor.

SUMMARY OF THE INVENTION

Under the circumstances, it is an object of this invention to provide a process for producing ferrite stainless steel foil covered with oxide whisker, suitable for catalyst supports in automobile's exhaust gas converters, from ferrite stainless steel substantially free from or poor in aluminum. And, this object can be accomplished by a process for producing ferrite stainless steel covered with oxide whisker, characterized by comprising: plating ferrite stainless steel with aluminium, diffusing the aluminium into the ferrite stainless steel by heating in vacuum or in nonoxidizing gas so that the surface of the ferrite stainless steel turns into an aluminium-enriched ferrite phase, and allowing oxide whisker to grow there by heating in the air.

DETAILED DESCRIPTION OF THE PREFERRED EMBODIMENT OF THE INVENTION

A production process of ferrite stainless steel covered with oxide whisker of this invention comprises: plating ferrite stainless steel with aluminium, diffusing the aluminium into the ferrite stainless steel by heating in vacuum or in a non-oxidizing gas so that the top of the ferrite stainless steel turns into an aluminium-enriched ferrite phase, and allowing oxide whisker to grow there by heating in the air.

In this invention, ordinary ferrite stainless steel, commonly containing aluminium, can be plated with aluminium in order to have its top layer turned into an aluminiumenriched ferrite phase. But it is more desirable to use an aluminium-poor ferrite stainless steel, substantially free from aluminium or containing not more than 3 percent of aluminium. In this connection, it is also desirable to use a ferrite stainless steel that contains 10–30 percent of chromium, not more than 3 percent of aluminium, and optionally, 0.1–1.0 percent of rare earth element such as Y, La, or Ce. Usually, however, mass-produced various sorts of stainless steels such as SUS 410L, SUS 430, SUS 430LX and the like can be used in accordance with this invention.

The plating of aluminium may be conducted by the hotdipping process, the electroplating process or the cold clading process. But the mechanical plating process is more preferable, because it is capable of plating very thin metal foil at room temperatures in the air. The process virtually comprises: brushing stainless steel with a brush made out of aluminium or aluminium alloy wire, ribbon or tape so as to form thin aluminium or aluminium alloy layer on the stainless steel.

Another process is similarly applicable to this invention; it comprises: scratching a block of metal for plating with a pure metal or alloy wired brush so that a trace of the plating metal clings to the brush, and mechanically plating a third metal with the plating metal by means of the same brush. In the second process, a cylindrical brush densely planted with stainless steel or hard steel wire is favorably used. Aluminium or aluminium alloy is used as a plating metal in a block, desirably in a cylindrical form.

Figure 3:
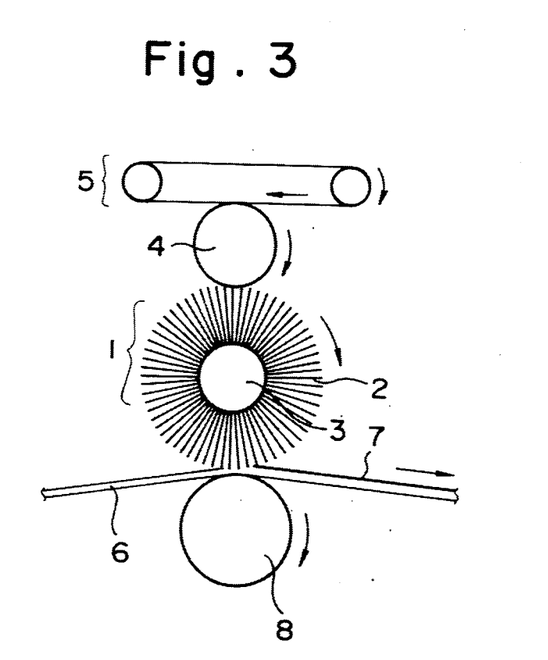
FIG. 3 is an illustration showing the mechanical plating process used in this invention.

An example of the mechanical plating process is shown in FIG. 3, wherein 1 denotes a metal brush, 2 denotes metal wire, such as stainless steel or hard steel, 3 denotes a cylindrical support for metal wires, 4 denotes a cylindrical aluminium block as plating metal, 5 denotes an endless belt type abraiser, 6 denotes a length of ribbon metal to be plated, 7 denotes a plated aluminium layer, and 8 denotes a contact roll.

As seen from the illustration, when the metal brush 1 is rotated rapidly with its wire 2 being touched to both the aluminium block 4 and the ribbon metal 6 to be plated, an aluminium layer deposits on the ribbon metal 6. The surface of the aluminium block 4 can be refreshed by rotating the aluminium block 4 and the endless belt type abraiser 5 in the reverse direction with each other.

With regard to the thickness of the aluminium layer 7 to be put on by the mechanical plating process, there is no limitation in particular. But, when an aluminium layered foil is to be used for catalyst supports in automobile's exhaust gas converters, the total amount of aluminium has to be adjusted to 3 percent and above in the foil after heat-treatment so that the foil can withstand prolonged oxidation at 800°–950° C. Therefore, the thickness of aluminium layer to be put on stainless steel is naturally different from case to case with the thickness and the aluminium content of ferrite stainless steel foils.

In order to grow oxide whisker on the ferrite stainless steel, it is useless to conduct heating in the air directly as it is; that is, it is necessary to previously diffuse aluminium into the ferrite stainless steel by heat-treatment before the heating in the air. The heat-treatment for difusing aluminium is usually conducted at a temperature between 700° and 1200° C. for as long a duration as the aluminium content reach at least 6 percent on its surface. When this heat-treatment is conducted below 700° C., it takes many hours; and when it is conducted above 1200° C., crystal grains in the oxide whisker tend to be so coarse that the ferrite stainless steel becomes brittle.

The reason for adjusting the surface aluminium content to at least 6 percent in the ferrite stainless steel comes from the necessity of allowing oxide whisker to uniformly grow on it. The heat-treatment for diffusing aluminium into the ferrite stainless steel is conducted in vacuum or non-oxidizing gas. From this standpoint, the lower the oxygen partial pressure, the better the result is. Specifically, the sufficient heat-treatment can be made if the oxygen partial pressure is maintained at 0.76 Torr and below, the degree of vacuum is maintained at $1 \times 10^{-4}$ Torr and below, or the dew point is maintained at $-40°$ C. and below in the hydrogen atmosphere.

The heat-treatment for diffusing aluminium should be made after aluminium plating, when the aluminium-plating is made on the ferrite stainless steel. However, when aluminium plating is made before the ferrite stainless steel is cold-rolled, the heat-treatment should be made after coldrolling after the aluminium-plating, or after the aluminium-plating and before the cold-rolling.

According to this invention, the heat-treatment is made in order to diffuse aluminium into the ferrite stainless steel, but not to form whisker seeds in it. That is, oxide whisker is allowed to grow on the ferrite stainless steel by directly heating in the air after conducting more than 50 percent cold-rolling after the heat-treatment. Also, oxide whisker is allowed to grow on the ferrite stainless steel by directly heating in the air after the removal of thin oxide layer, formed by the heat-treatment, by rinsing with acid solution. These facts can be acconted for that the surface of the ferrite stainless steel is fully loaded with aluminium by the mechanical plating process and turns into an aluminium-enriched ferrite phase of the aluminium content 6 percent and above by the heat-treatment for diffusing aluminium.

Oxide whisker is permitted to grow on the ferrite stainless steel by heating in the air, after the heat-treatment, or after the cold-rolling following the heat-treatment.

The heating temperature is desirable to lie between 850° and 950° C.; the heating duration is sufficient if it extends to 8 hours or more at 900° C. or 4 hours or more at 925° C., for example. When the heating temperature is below 850° C., it takes very long time to produce oxide whisker of high aspect ratio, which inevitably makes commercial production difficult. When the heating temperature is above 950° C., it is impossible to produce oxide whisker of high aspect ratio; instead of that, there forms oxide in a block or a flatend form.

As stated above, since this invention has made it possible to grow oxide whisker of high aspect ratio on the surface of commercially produced aluminium-poor ferrite stainless steel by turning only the upper region near the surface into an aluminium-enriched ferrite phase, the influence of this invention on the relevant industries is economically great. Moreover, the oxide whisker of high aspect ratio allowed to grow on the ferrite stainless steel by this invention is suitable for catalyst carrier in automobile's exhaust gas converters.

The oxide whisker grown on the ferrite stainless steel by this invention has proved to be $\theta$-alumina whisker by the analysis of its X-ray diffraction pattern and the observation under a transmission electronmicroscope. The $\theta$-alumina whisker is not only more active than $\alpha$-alumina but also shows good adhesion to catalyst-impregnated $\gamma$-alumina.

The present inventors have also showed that $\theta$-$Al_2O_3$ whisker can be produced by a process, comprising: heating iron-based metal at a temperature between 600° and 1100° C. in an atmosphere of the oxygen partial pressure 0.04 atm. and below and then heating the iron-based metal at a temperature between 850° and 975° C. in the air, wherein at least the surface of the iron-based metal initially contains 10–30 percent of chromium and 6–20 percent of aluminium.

When the primary heating is conducted under an oxygen partial pressure exceeding 0.04 atm, the metal is covered with such chromium oxide that the alumina whisker is not allowed to grow by the secondary heating. The reason for setting the primary heating temperature to 600° –1100° C. comes from the fact that when it is below 600° C., sufficient alumina oxide necessary for developing into oxide whisker does not form; and when it is above 1100° C., oxide whisker does not grow by the secondary heating. As far as the energy cost is concerned, the lower the heating temperature the more cheaply the process can be made. From this economical point of view, the heating temperature is desirable to be in the range 600°–850° C., and the heating time is sufficient with 1–100 minutes. Thus, the heating is possible to be continuously conducted by a commercial production line.

The reason for setting the secondary heating temperature to 850°–975° C. comes from the fact that when it is below 850° C. or above 975° C., the formation of $\theta$-Al$_2$O$_3$ is nowhere to be found. As for the heating time, not less than 4 hours properly suffice for the purpose.

As a result of conducting various experiments, the present inventors learned that the transformation temperature of $\theta$-Al$_2$O$_3$ occurs lower than that of natural gibbsite, and that it is necessary to preliminarily form Al$_2$O$_3$ film on the iron-based metal in order to grow $\theta$-alumina whisker there, in the case that at least the surface of the iron-based metal contains 10–30 percent of chromium and 6–20 percent of aluminium.

Thus, they forwarded experiments in order to look for the growing condition of Al$_2$O$_3$ film and the growing condition of $\theta$-alumina whisker therefrom.

Figure 5:
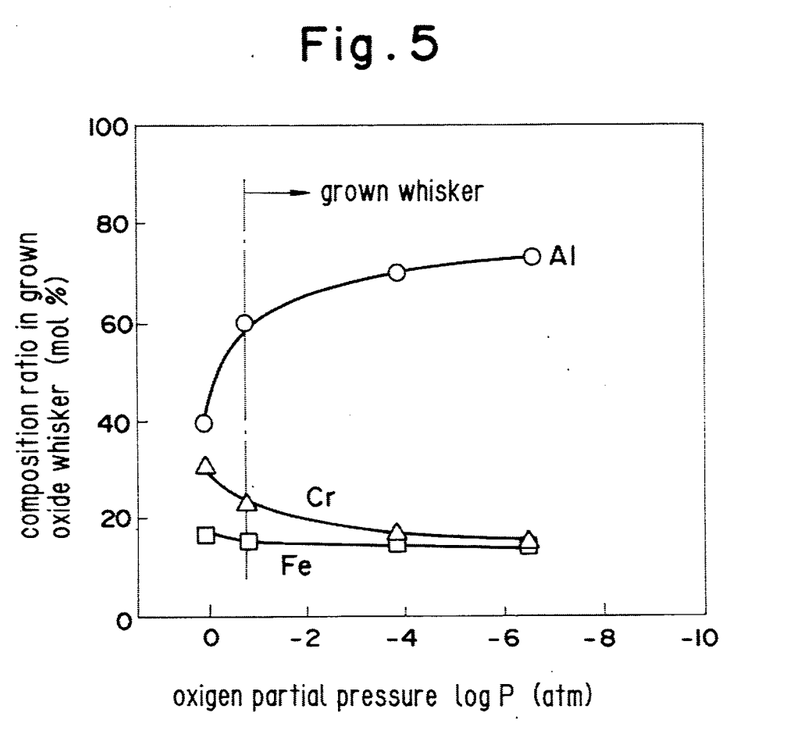
FIG. 5 is a graph showing the relation between the oxygen partial pressure and the composition ratio among Al, Cr, and Fe contained in grown oxide whiskers.

To study the relation between the primary heating condition and the whisker growth, Fe-20Cr-9Al stainless steel, produced powder metallurgically, was heated at 800° C. for one minute under various oxygen partial pressures, and then subjected to oxidation at 925° C. for 4 hours in the air. The result is given in FIG. 5, from which is deduced a conclusion that the aluminium content in oxidized film varies with the decrease of the oxygen partial pressure, and the whisker appears there, from 0.04 atm. and below and from the time the aluminium content reaches 60 molar percent.

Next, the same specimen was heated under an oxygen partial pressure of 0.02 atm. with the temperature varied stepwise between 500° and 1200° C., and with the time varied stepwise between 0.5 and 100 minutes, and then heated at 850° C. for 16 hours in the air in order to see if there forms the whisker. The result is shown in Table 1, from which it is safe to say that the growth condition of the whisker lies between 600° and 1100° C. as to the heating temperature and between 1 and 100 minutes as to the heating time.

Apart from the above, Fe-20Cr stainless steel was plated with aluminium by a mechanical plating process disclosed in Japanese patent application No. sho 62-299714 by the present inventors; the process comprising: scratching alminium off an aluminium block by a hard steel wired brush and mechanically plating metal with the scratched-off aluminium.

TABLE 1

| Heating temperature (°C.) | Heating time (minute) | | | | |
|---|---|---|---|---|---|
| | 0.5 | 1 | 10 | 50 | 100 |
| 500 | X | X | X | X | X |
| 600 | Δ | ○ | ○ | ○ | ○ |
| 700 | Δ | ○ | ○ | ○ | ○ |
| 800 | Δ | ○ | ○ | ○ | ○ |
| 900 | Δ | ○ | ○ | ○ | ○ |
| 1000 | Δ | ○ | ○ | ○ | ○ |
| 1100 | Δ | ○ | ○ | ○ | ○ |

TABLE 1-continued

| Heating temperature (°C.) | Heating time (minute) | | | | |
|---|---|---|---|---|---|
| | 0.5 | 1 | 10 | 50 | 100 |
| 1200 | X | X | X | X | X |

X: No whisker grows.
Δ: Something grows, but is not confirmed as whisker.
○: Whisker grows.

After plated, the metal specimen was heated at 850° C. for 30 minutes under an oxygen partial pressure of 0.02 atm. to diffuse the aluminium into it and allow alumina whisker to grow on it. The aluminium content of the surface was 75 molar percent. The same metal specimen was heated in the air with the temperature varied stepwise between 800° and 1050° C. and with the time varied stipwise between 2 and 150 hours to see if there would form the whisker. The result is shown in Table 2, from which it is safe to say that heating between 850° and 975° C. for more than 4 hours is proper to grow the whisker.

TABLE 2

| Heating temperature (°C.) | Heating time (hour) | | | | | |
|---|---|---|---|---|---|---|
| | 2 | 4 | 16 | 50 | 100 | 150 |
| 800 | Δ | Δ | Δ | Δ | Δ | Δ |
| 850 | Δ | ○ | ○ | ○ | ○ | ○ |
| 900 | Δ | ○ | ○ | ○ | ○ | ○ |
| 950 | Δ | ○ | ○ | ○ | ○ | ○ |
| 975 | Δ | ○ | ○ | ○ | ○ | ○ |
| 1000 | Δ | Δ | Δ | Δ | Δ | Δ |
| 1050 | X | X | X | X | X | X |

X: No whisker grows.
Δ: Something grows, but is not confirmed as whisker.
○: Whisker grows.

An electronmicroscope was used to confirm the appearance of the whisker and an X-ray diffractometer was used to identify the crystal structure of it. The metal specimen containing aluminium was put to use as a honeycomb-structured catalyst carrier for automobile's exhaust gas convertor; as a result of the practical use, the alumina whisker on the specimen proved to grow by an unusual special oxidation mechanism. That is, the whisker continued to grow on the honeycomb under the practical condition. Its growth rate proved to be faster than that of alumina protective layer commonly observed. In fact, the adhesion of catalyst to the catalyst carrier was interrupted, and the oxidation-resistance of the catalyst carrier was also deteriorated by the rapid crystal growth of the whisker.

In order to eliminate such problems, it became necessary to control the rapid crystal growth rate of the whisker down to a growth rate of common alumina protective layer which accompanies neither the generation nor the growth of alumina whisker.

Actually, the control of the rapid whisker growth could be accomplished by heating an aluminium-containing stainless steel to 975° C. and above, preferably to a temperature between 1000° and 1200° C. Briefly, this process is for controlling the rapid whisker growth on an aluminium-containing stainless steel. Thus, when the heating temperature does not reach 975° C., controlling the whisker growth is impossible; and when it exceeds 1200° C., the crystal grains become so too large that the ductility of an aluminium-containing stainless steel undesirably falls.

The heat-treatment may be conducted in an oxidizing or a non-oxidizing atmosphere. Nevertheless, more desirable is to conduct it in a non-oxidizing atmosphere such as carbon dioxide, nitrogen, hydrogen, rare gas, or vacuum the degree of which is kept at $1 \times 10^{-4}$ Torr and below, because the alumina whisker is not to be broken with the progress of oxidation.

The heating time is desirable to be approximately in the range one minute to one hour. The higher the heating temperature, the shorter the heating time as a matter of course. Practically speaking, however, the effect of heating will appear in 30 minutes at 1000° C., and in 10 minutes at 1100° C., for example. After all, desirable is conducting ing the heat-treatment at 1050° C. for 30 minutes in an atmosphere of argon, hydrogen, nitrogen, or in vacuum.

The reason for limiting the heating temperature to 975° C. and above comes from the fact that any alumina whisker does not appear in the temperature range higher than that, and there forms only a dense aluminium oxide layer strongly adhering to the substrate, as seen in a common, oxidized, aluminium-containing Fe-Cr based alloy.

Any stainless steel, as long as this invention is applicable to them, may be shaped into a plate, foil, tube or any other form. Nevertheless, they are desirable to be used as foil for a honeycomb-structured catalyst carrier in automobile's exhaust gas convertors. This invention will be described more concretely with reference to the following examples, but this invention is never to be construed as being limited by the examples.

Example 1

Figure 1:
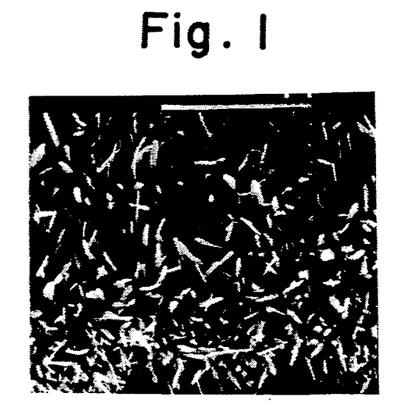
FIG. 1 is a scanning electronmicrograph showing the growth of oxide ($Al_2O_3$) whisker on the surface of SUS 430 stainless steel obtained in Example 1.

A foil of SUS 430 stainless steel, $0.05t \times 100w \times L$, is plated with aluminium 5 μm thick by the mechanical plating process afore-mentioned. The heat-treatment for diffusing the aluminium into the substrate is conducted at 900° C. for one hour in a vacuum of $2 \times 10^{-5}$ Torr. The heat-treatment for oxidation is conducted at 900° C. for 16 hours in the air. The surface of the oxidized stainless steel observed under a scanning electronmicroscope is shown in FIG. 1. About 5 μm long oxide whisker crystal is found to have densely grown over the surface.

Example 2

Figure 2:
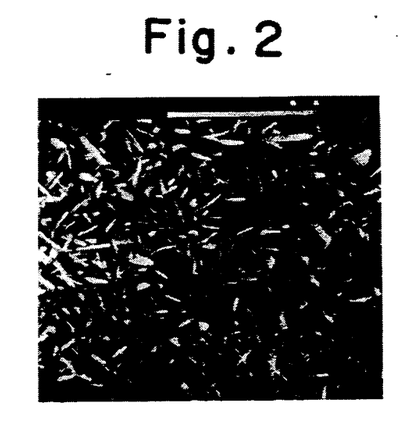
FIG. 2 is a scanning electronmicrograph showing the growth of oxide ($Al_2O_3$) whisker on the surface of 18%Cr-2.5%Al stainless steel obtained in Example 2.

A foil of 18%Cr-2.5%Al stainless steel, $0.04 \times 75w \times L$, is plated with aluminium 3 μm thick on both the surface by the mechanical plating process. Subsequently, it is heated at 1000° C. for 30 minutes in hydrogen atmosphere (dew point: $-50°$ C.) in order for the aluminium to diffuse into the substrate. After cleaned with 1-N hydrofluoric acid solution and then with 1-N nitric acid solution, it is heated at 1100° C. for 5 minutes in a $2 \times 10^{-5}$ Torr vacuum, and then at 925° C. for 8 hours in the air for oxidation. The surface of the oxidized stainless steel observed under a scanning electronmicroscope is shown in FIG. 2. About 3 μm long oxide whisker is found to have sensely grown over the surface.

Examples 3-5

Three sheets of stainless steels, one the aluminium-poor stainless steel 20Cr-2.5Al, and two others SUS 409L and SUS 430LX, substantially free from aluminium, their thickness being 0.04 mm, 0.20 mm, and 0.10 mm, respectively, are plated with aluminium by a mechanical plating process illustrated in FIG. 3, with a 0.18 mm SUS 304H wired brush, 250 mm across, being rotated at 3000 rpm and touched to a cylindrical aluminium block, 200 mm across, and each of the stainless steel sheets The thickness of the aluminium on each of the stainless steel sheets is given in Table 3.

After the aluminium-plating, each of them is made into foil by a sequence of processes ending with oxidation in the

TABLE 3

Figure 4:
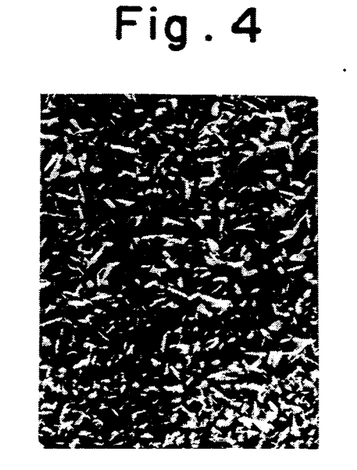
FIG. 4 is a scanning electronmicrograph showing the growth of oxide ($\theta$-$Al_2O_3$) whisker on the surface of 20Cr-2.5Al stainless steel obtained in Example 5.

| | | Examples 3, 4, and 5 | | |
|---|---|---|---|---|
| Ex. | Stainless steel (thickness) | Al thickness on one side | Process after Al-plating | Grown whisker (length) |
| 3 | SUS 409L (0.04 mm) | 3 μm | Heat-treatment (800° C. × 1 hr. in argon) ↓ Oxidation in the air (900° C. × 16 hrs.) | $\theta$-Al$_2$O$_3$ (over 2 μm) |
| 4 | SUS 430LX (0.02 mm) | 10 μm | Cold-rolling to 0.05 mm ↓ Heat-treatment for Al diffusion (950° C. × 1 hr. in $1 \times 10^{-4}$ Torr vacuum) ↓ Oxidation in the air (920° C. × 8 hrs.) | $\theta$-Al$_2$O$_3$ (over 2 μm) |
| 5 | 20 Cr–2.5 Al | 5 μm | Heat-treatment for Al diffusion (900° C. × 1 hr. in argon) ↓ Cold-rolling to 0.04 mm ↓ Oxidation in the air (900° C. × 16 hrs.) | $\theta$-Al$_2$O$_3$ (over 2 μm) | air. The shape of oxides is observed under a scanning electronmicroscope, and their identification is made by X-ray crystallography, from which $\theta$-Al$_2$O$_3$ proves to have formed on the substrate. FIG. 4 shows a scanning electronmicrograph of $\theta$-Al$_2$O$_3$ whisker produced in Example 5. About 3 μm long whisker crystal is found to have grown on each of the substrates.

Example 6

Figure 6:
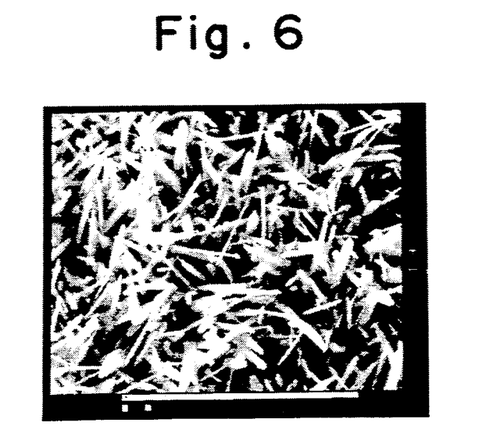
FIG. 6 is a scanning electronmicrograph showing the growth of oxide ($\theta$- $Al_2O_3$) whisker on the surface of Fe-25Cr-110Al stainless steel obtained in Example 6.

A foil of 50 μm thick stainless steel is produced from 10 kg of Fe-25Cr-10Al by way of a sequence of processes: melting in an air-introduction type furnace, forging, hot-rolling, and cold-rolling. The foil is heated at 700° C. for 30 minutes in an atmosphere of the oxygen partial pressure 0.02 atm. $\theta$-Al$_2$O$_3$ whisker is allowed to grow on it by heating the stainless steel at 850° C. for 16 hours in the air. FIG. 6 shows the whisker crystal. The foil covered with the whisker is painted with washcoat used for catalyst supports in automobile's exhaust gas converters. After that, it is subjected to ultrasonic vibration in water in order to see if the washcoat flakes off. It does not flake off, thus, the foil proves to be very suitable for catalyst support in the exhaust gas converters.

Example 7

Fe-30Cr-8Al is produced powder metallurgically. It is heated at 650° C. for one hour in an atmosphere of the oxygen partial pressure 0.02 atm. Subsequently, it is heated at 850° C. for 50 hours in the air so as to grow $\theta$-Al$_2$O$_3$ on it. The same test as in Example 1 is conducted with this material; however, the flaking off of washcoat is nowhere to be found.

Example 8

Figure 7:
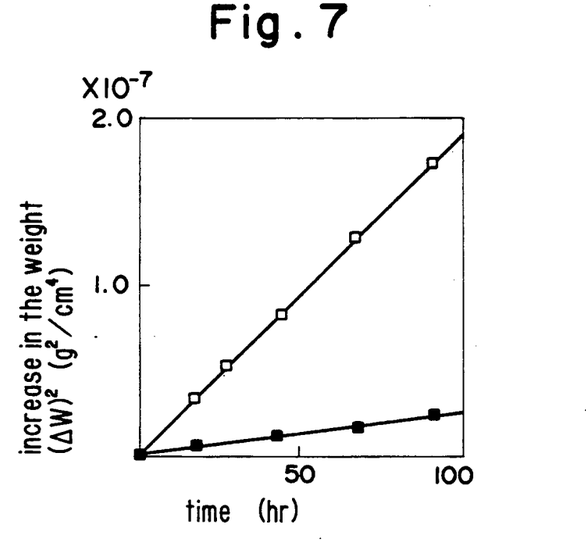
FIGS. 7 and 8 are a graph showing the weight gain 900° C. in air of ferrite stainless steels having or having not undergone the $Al_2O_3$ whisker growth control treatment.

A foil of rolled 20%Cr-5%Al stainless steel is heated at 900° C. for one minute in a $5 \times 10^{-5}$ Torr vacuum, and then oxidized at 900° C. for 16 hours. The thickness of the stainless steel covered with alumina whisker measures 50 μm. The same stainless steel is heated at 1050° C. for 30 minutes in the air, and then oxidized at 900° C. in the air. The weight gain of the stainless steel is shown in FIG. 7 as solid squares, together with that of stainless steel (hollow squares) omitting the second heating (at 1050° C. for 30 minutes in the air). As seen from FIG. 7, the weight gain of stainless steel is lessened very much by conducting the second heating or additional heat-treatment. This tells that the growth of whisker is controlled as much by the additional heat-treatment.

Example 9

Figure 8:
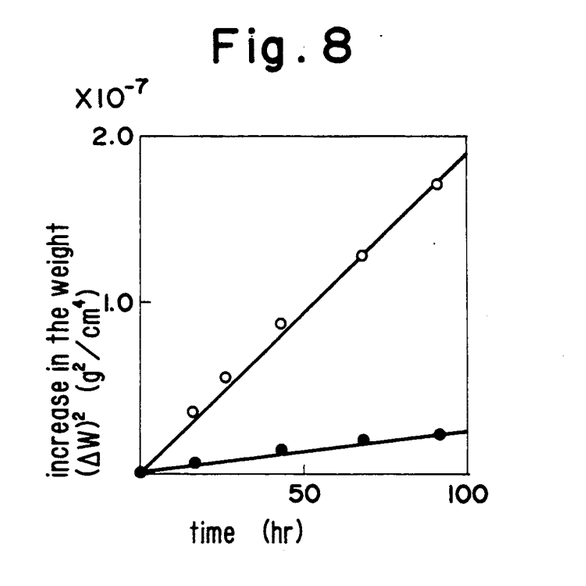

A foil of 50 μm thick 18%Cr-3%Al stainless steel is plated with Al 2 μm thick in the same way as in Example 1. The stainless steel is heated at 900° C. for one hour in an atmosphere of the oxygen partial pressure $2 \times 10^{-5}$ Torr, oxidized at 900° C. for 16 hours in the air to grow alumina whisker, heated at 1100° C. for 10 minutes in vacuum ($2 \times 10^{-5}$ Torr), and then continuously heated at 900° C. for 100 hours in the air. The weight gain of the stainless steel is shown in FIG. 8 as solid circles, together with that of stainless steel (hollow circles) omitting the heating at 1100° C. for 10 minutes in vacuum ($2 \times 10^{-5}$ Torr). As seen from FIG. 8, the weight gain of stainless steel is lessened by conducting the second heating or additional heat-treatment. This tells that the growth of whisker is controlled as much by the additional heat-treatment.

Figure 9:
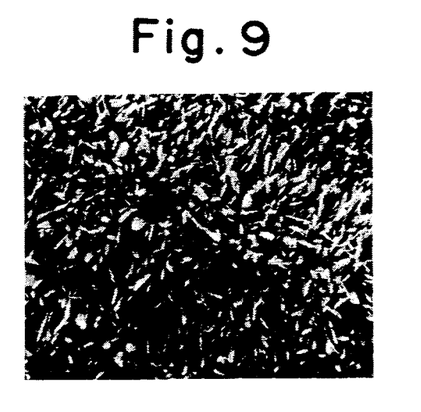
FIGS. 9 through 11 are a scanning electronmicrograph of the magnification 4500 showing the appearance of alumina whisker, before and after the whisker growth control treatment, and after 100 hour's oxidation at 900° C. following the whisker growth control treatment, respectively.
Figure 10:
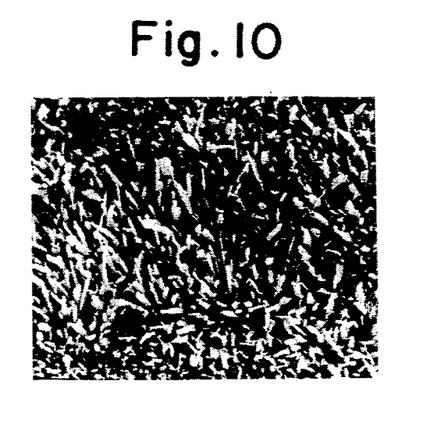
Figure 11:
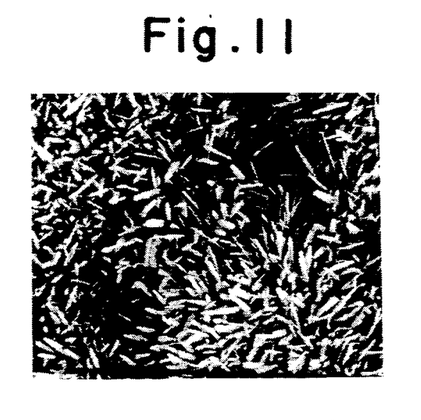

FIGS 9 through 11 are a scanning electronmicrograph of the magnification 4500 showing the appearance of alumina whisker, before and after the whisker growth control heat-treatment, and after 100 hour's oxidation at 900° C. in air following the whisker growth control treatment, respectively.

What is claimed is:

1. A process for controlling the continued growth of alumina whisker on ferrite stainless steel, comprising:
heating ferrite stainless steel covered with alumina whisker at a temperature between 1000° C. and 1200° C. for about 1 minute to 1 hour.

2. The process according to claim 1, wherein said heating is carried out in a non-oxidizing atmosphere.

3. The process according to claim 2, wherein said non-oxidizing atmosphere is selected from the group consisting of carbon dioxide, nitrogen, hydrogen, rare gas and a vacuum of a degree of $1 \times 10^{-4}$ Torr or below.

* * * * *